(12) United States Patent
Lu et al.

(10) Patent No.: US 6,202,080 B1
(45) Date of Patent: Mar. 13, 2001

(54) APPARATUS AND METHOD FOR COMPUTER JOB WORKLOAD DISTRIBUTION

(75) Inventors: James Lu; Shao-Min Juan; Anand Asava, all of Plano, TX (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/988,682

(22) Filed: Dec. 11, 1997

(51) Int. Cl.[7] ............................................. G06F 9/00
(52) U.S. Cl. ......................... 709/105; 709/219; 709/223
(58) Field of Search .................................. 709/100, 102, 709/103, 104, 105, 217, 219, 223

(56) References Cited

U.S. PATENT DOCUMENTS

| | | | |
|---|---|---|---|
| 5,032,979 | * 7/1991 | Hecht ................................. | 713/201 |
| 5,053,950 | * 10/1991 | Naganuma et al. .................. | 364/200 |
| 5,283,897 | * 2/1994 | Georgiadis et al. ................. | 395/650 |
| 5,675,791 | * 10/1997 | Bhide et al. ........................ | 395/621 |
| 5,845,265 | * 12/1998 | Woolston ............................ | 705/37 |
| 5,923,850 | * 7/1999 | Barroux ............................. | 709/224 |
| 6,026,425 | * 2/2000 | Suguri et al. ...................... | 709/105 |
| 6,047,323 | * 4/2000 | Krause .............................. | 709/227 |

\* cited by examiner

Primary Examiner—Majid Banankhah
(74) Attorney, Agent, or Firm—Carr & Storm, L.L.P.

(57) ABSTRACT

A job distribution system implemented by a computer network having a plurality of nodes, each having a cross-mounted local directory. The job distribution system has a job balance object, a node-processing object, and an updatable node distribution table. The job distribution system is on a first node of the plurality of nodes. A node daemon object is on each of the plurality of nodes. The job balance object has access to the local directory of each remaining node. The updatable node distribution table has a plurality of distribution data structures which correspond to each of the remaining nodes, and are updated by the node daemon object with a job status value. With these objects, the job balance object distributes the plurality of jobs by averaging the job status value of each of the remaining nodes to distribute a plurality of the pending job requests.

16 Claims, 5 Drawing Sheets

APPARATUS AND METHOD FOR COMPUTER JOB WORKLOAD DISTRIBUTION

MICROFICHE APPENDIX

A microfiche appendix having one page of microfiche with a total of 50 frames of a computer program set out in at least three software objects constitutes a part of the specification of this invention pursuant to 37 C.F.R. §§ 1.77 and 1.96, the microfiche appendix being incorporated by reference herein for all purposes.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyrights whatsoever.

TECHNICAL FIELD

The present invention relates to computer job workload distribution on a network, and in particular, to an apparatus and method for job workload distribution on a network utilizing a network file system.

BACKGROUND OF THE INVENTION

Although computer data is commonly shared with networked workstations, the collective computer power of a distributed-systems network remains under-utilized for computer job workload distribution. A distributed-systems network comprises a plurality of networked computer workstations. Each workstation is commonly referred to as a node. The nodes are in communication with each other through network communications protocols. A job is a computer workstation command. For each command execution, an allotment of Central Processing Unit ("CPU") and electronic memory resources is required. "Compile," "halt," and "extract" are some examples of workstation commands.

Commonly, computer jobs requested are submitted in batch-queue or job-set fashion, to a single node. The jobs are typically executed by a node on a "first-come first-served" basis. When a computer job is completed, then the next job is queued for execution. The job execution process continues until the batch queue is completed. Accordingly, batch-queue submissions take a single node many hours to complete.

Reducing the execution time for multiple job requests is particularly important for telecommunication switch testcase environments. The faster the test jobs can be executed, the faster telecommunications switches can be ready for installation. These testcase environments automate test jobs for telecommunication switch "burn-in." Examples of test jobs are database testcase extractions, package testcases for execution efficiency, testcase compilations, testcase executions, testcase execution result analysis, and testcase result database storage. These jobs can be combined and submitted to a node as a testcase set, which is a form of batch-queue submission.

To decrease the time to process job batch-queues, job workload distribution programs have been developed. But these programs are complex and cumbersome to use. Such programs have required a high-level system access to the root file system of a UNIX-based network. The root file system is an upper-level configuration layout of the network nodes. Such job workload distribution programs must query the root file system to determine whether data storage is available and whether distribution is even permitted to certain nodes.

Also, because root-level access is needed, these programs require hard-coded and application-specific network configurations. That is, the program must be tailored to the idiosyncracies of the network before it can be used. Further, root-level access is restricted to a single system administrator. When the network structure changes, due to additions or deletions of nodes, not only must the system administrator modify the network root file, but also reconfigure the distribution program to mirror the network changes.

Furthermore, when a program demands root-level access, the overall "controllability" and "granularity" characteristics of the network are adversely affected. That is, system level commands have been limited to large "work units" (low granularity). Large work units restrict the flexibility for a lower-level user—such as an application level user—to manipulate a work unit (low control level).

Workload distribution programs have also relied on electronic messaging formats to distribute jobs to other network nodes. But such electronic messaging is not robust because of susceptibility to power fluctuations. Data message records are not typically saved to a disk. Thus, a power failure or a node crash on the network jeopardizes the in-transit message-data because the information is not maintained.

Thus, a need exists for a simplified workload distribution method and apparatus that does not require root-level access to distribute job workloads across a network. Also, a workload distribution method and apparatus is desired that has a greater robustness, or ability to function or continue functioning in unexpected situations.

SUMMARY OF THE INVENTION

These and other disadvantages are overcome by the present invention, which comprises an improved method and apparatus for job workload distribution in a computer network.

In a first aspect of the invention, provided is a job distribution system implemented by a computer network. The computer network has a plurality of nodes, with each of the nodes having a local directory that is cross-mounted with other network node directories. With cross-mounted directories, the networking capacity is invoked automatically, and the physical layout of the network is hidden from the user. The result is, in virtual terms, a single, large, distributed computer system.

The job workload distribution system has a job balance object, a node daemon object, and an updatable node distribution table. The job distribution system is on a first node of a plurality of nodes. This node can be either a local node, which holds the network server application, one of the remaining or remote nodes, or a combination local/remote node. The node daemon object is on each remaining node of the plurality of nodes, and the job balance object has access to the local directory of each of the remaining nodes. The updatable node distribution table has a plurality of distribution data structures. Each of these data distribution structures corresponds to each of the remaining nodes, and are updated by the node daemon object with a job status value, such as "complete," "aborted," or "failed." The job balance object distributes the plurality of jobs among the remaining nodes according to an average job status of each of the remaining nodes.

In another aspect of the invention, a workload distribution method for a computer network is provided. The workload distribution method is for a network having at least one local node and at least one remote node. The local directories of each node are cross-mounted with each other. The workload distribution method provides at least an updatable node distribution table with a plurality of distribution data structures. Each of the distribution data structures corresponds to a network node. A plurality of job requests are submitted by a resident client object. Each of the plurality of nodes updating the distribution data structure with a job status that corresponds to that remote node. The job requests are balanced among the plurality of nodes when a balancing criteria as a function of the job status value of each node. The distribution data structures relating to each of the remote nodes are updated as job requests are executed.

BRIEF DESCRIPTION OF THE DRAWINGS

The accompanying drawings are incorporated into and form a part of the specification to illustrate examples of the present invention. These drawings together with the written description serve to explain the principles of the invention. The drawings are only for purposes of illustrating preferred or alternate examples of how the invention can be made and used and are not to be construed as limiting the invention to only the illustrated and described examples. The various advantages and features of the present invention will be apparent from a consideration of the drawings in which.

DESCRIPTION OF THE PREFERRED EMBODIMENTS

The principles of the present invention and their advantages are best understood by referring to the embodiment depicted in FIGS. 1–5, in which like reference numbers describe like parts.

A. Network File Structure Systems and Cross-Mounted Node Directories

Figure 1:
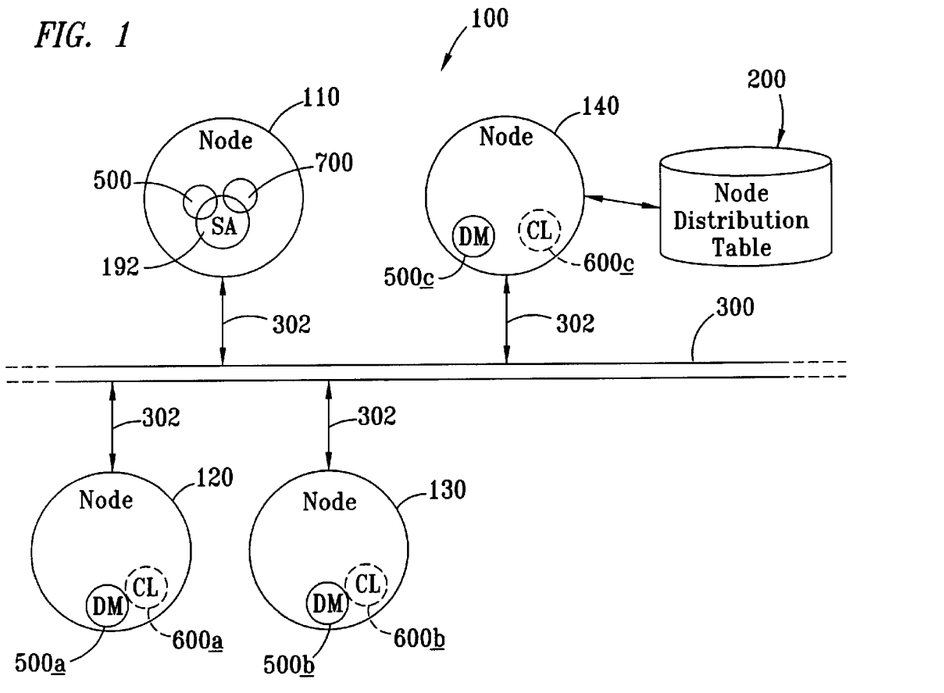
FIG. 1 is a diagram of a portion of a node cluster of a computer network implementing the computer job workload distribution apparatus and method of the invention.

Referring to FIG. 1, shown is a method and apparatus for computer job workload distribution implemented by a computer network embodied by a node cluster 100. The node cluster 100 is implemented in a Network File System ("NFS") structure to cross-mount the node directories. In this manner, each node has a globally accessible file directory that is accessible across the network. Also, the networking capacity is invoked automatically, and the physical layout of the network is hidden from the user. The result is, in virtual terms, a single, large, distributed computer. Files can be accessed simply by their "FileName," regardless which node the user accesses the network through or the physical location of the file.

The NFS deploys a cross-mounted directory structure. Several operating systems support cross-mounted directory structures, such as UNIX or Windows/NT®. Accordingly, a broad range of suitable operating-system platforms can utilize the present invention. Cross-mounted directory structures also allow static data storage in that at least one copy of a job request file is retained in a node directory on the network. In comparison, data messaging techniques relying on standard network communications protocols are more susceptible to data loss. For example, in a network failure, such as from power loss or the like, data in transit through the network would be unrecoverable because a copy is not typically retained.

The node cluster 100 has a plurality of nodes 110, 120, 130, and 140. Each of the nodes is preferably a powerful, stand-alone computer workstation having considerable calculating and/or graphics capability for executing computer jobs. The term "job" as used herein means a single action that can occur with a client computer application in computer environments. For example, such actions can comprise UNIX commands, script executions, program executions, or file transfers. In a testcase environment, such actions can comprise database testcase extractions, package testcases for execution efficiency, testcase compilations, testcase executions, testcase execution result analysis, and testcase result database storage. One or more of these jobs are combined in a unit known as a testcase sets.

A node cluster 100 has a local node 110 and at least one remote node, for example, either of the remote nodes 120, 130, or 140. A node with a network server application object 112 is defined as the first or local node 110. The term "object" as used herein means a program module with routines and/or data that is treated as a discrete entity, which is part of a program having a collection of discrete objects that interact with other objects. The server application object 112 provides administrative functions for controlling multi-user access to all or part of the network, such as, for example, node disk drives or printers.

The remaining nodes 120, 130, and 140 are remote nodes that perform user interaction and computer job submission processing through a user application, such as a Graphic User Interface ("GUI"). It should be noted that although a local node 110 can be configured in a dual-role as both a local and a remote node, this is not preferable due to the heightened managerial demands of the network server application object 112 on the local node 110.

In the embodiment shown in FIG. 1, the node cluster 100 has a Local Area Network ("LAN") backbone 300, a network server application object 112, and a node distribution table 200. The nodes 120, 130, and 140 are in communication with the application server object 112 through the LAN backbone 300 and a plurality of node communications links 302. The node communications links 302 can constitute either software modules, hardware drivers implemented in software, or any apparatus and associated software necessary to cause the node cluster 100 to perform the functions set forth in its specification. Further, it should be noted that the node distribution table 200 can be implemented in other program memory formats or structures, such as an array, an association of variables, or the like. But preferably, a table structure file is implemented.

The network "root level" of a network is typically a plurality of node clusters similar to the illustrated node cluster 100. That is, the "root level" is the main or uppermost level in a hierarchically-organized network node set. Software configurations at the root level are cumbersome, in contrast to an "application level," in which access can be had at any of the individual remaining nodes 120, 130, or 140, without requiring intimate working knowledge of the physical network structure.

Figure 2:
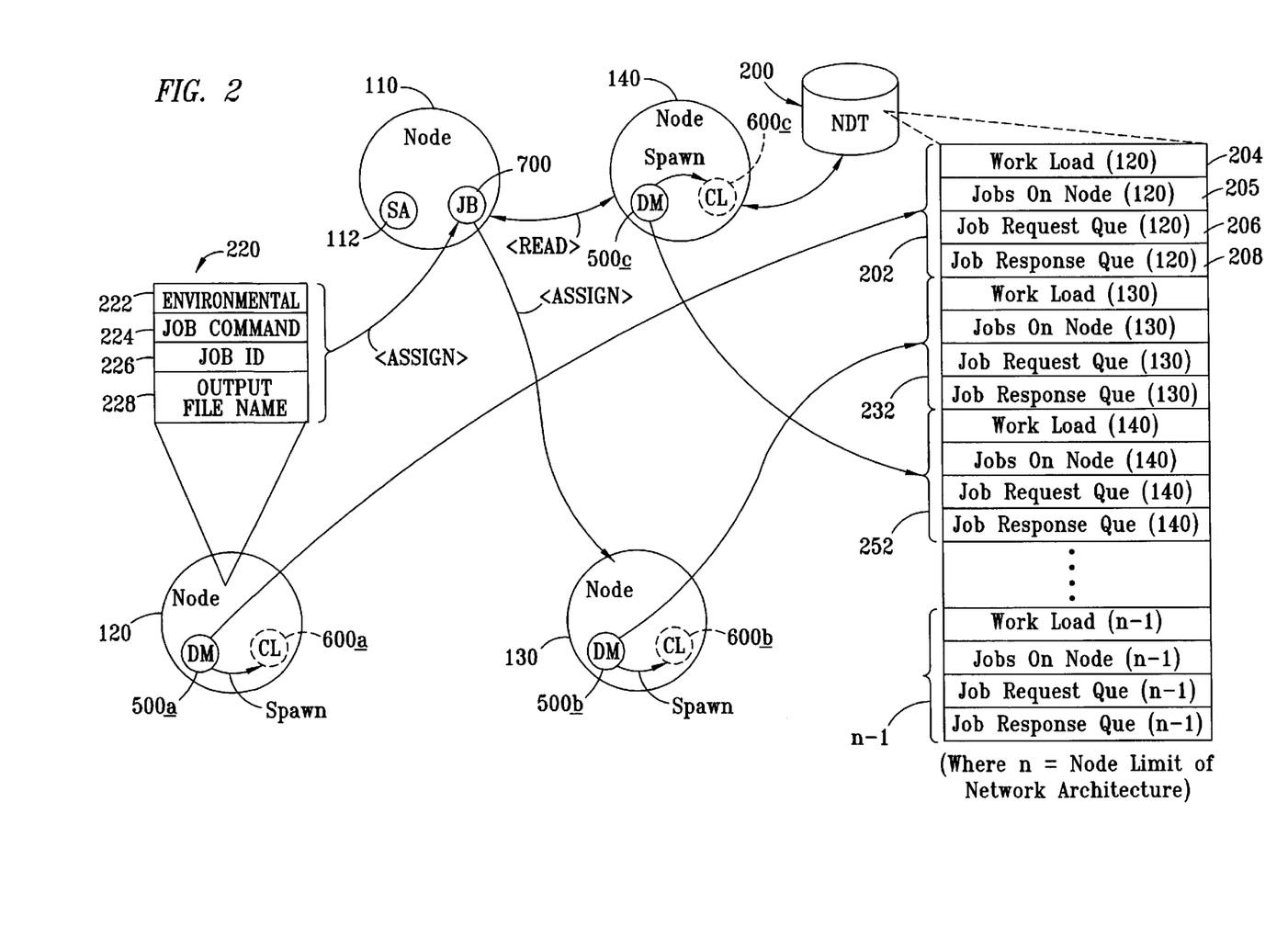
FIG. 2 is a diagram of the communications pathways between the nodes and the file structures of the invention.

Referring to FIG. 2, an example illustrating the communications pathways of the node cluster is shown. Generally, the basic communications pathways of the present embodiment are for commands to (1) SUBMIT a job, (2) UPDATE the node distribution table 200, (3) READ the node distribution table, (4) REASSIGN a pending job if available, and (5) WRITE updated job status values to the node distribution table 200.

A job is submitted as a Job Request File ("JRF") 220. The JRF 220 has an EnvironmentalVariable field 222, a JobCommand field 224, a JobID field 226 and an OutputFileName field 228. A JRF and its associated fields 222, 224, 226, and 228, are common to UNIX-based computer networks, and are not discussed in further detail herein.

When a job is submitted, a node daemon object 500 updates the node distribution table structure corresponding to that node. For clarity, the node daemon object on each node is given a separate letter designation: a, b, c, d, and the like. The understanding is that discussion of the node daemon object 500 applies to the separate node daemon objects 500a, 500b, and 500c, on the remote nodes 120, 130, and 140, respectively.

Still referring to FIG. 2, the node distribution table 200 on remote node 140 has a distribution data structure 202 that corresponds to remote node 120. Note that the node distribution table 200 can be on other nodes 110, 120, and 130 so long as every participating node has read-and-write access to the node distribution table 200. Each remote node 120,130 and 140 has a corresponding table structure 232 and 252, respectively. These data structures 202, 232, and 252, are updatable by node daemon objects 500a, 500b, and 500c.

The distribution table data structures 202, 232, and 252, each have a WorkLoad field 204, a JobsOnNode field 205, a JobRequestQue field 206, and a JobResponseQue 208. The WorkLoad field 204 contains information regarding the CPU and memory usage of a node. The JobsOnNode field 205 contains information regarding the total job amount of a node, which is typically a numerical value representing the number of pending jobs on that node. The JobRequestQue field 206 is the total number of pending jobs for a particular node. The JobResponseQue field 208 contains job responses from the termination (natural or aborted) of a job by spawned child process 600 (see FIG. 1). The JobRequestQue field 206 and JobResponseQue field 208 each preferably contain a list of pointers to job request files and job response files across the network. A "pointer" as used herein is a programming variable that contains the memory location or address of the files instead of the file itself.

In the communications example of FIG. 2, daemon object 500a SUBMITS a job by issuing a JRF 220 on the local disk directory of remote node 120. Daemon object 500a updates the data structure 202 in the node distribution table structure 200. The job balance object 700 READS the node distribution table structures 202, 232, and 252, to determine the job request files pending on the respective remote nodes 120, 130, and 140. With a distribution decision, the job balance object 700 ASSIGNS the JRF 220 to another remote node, in this example, to node 130 by copying the JRF 220 to the local directory of the remote node 130.

Nodes can be added or removed for use in the distribution process by adding or removing a corresponding distribution data structure in table 200. Nodes can be added up to the node capacity limit of the network.

B. Program Objects for Job Distribution

Figure 3:
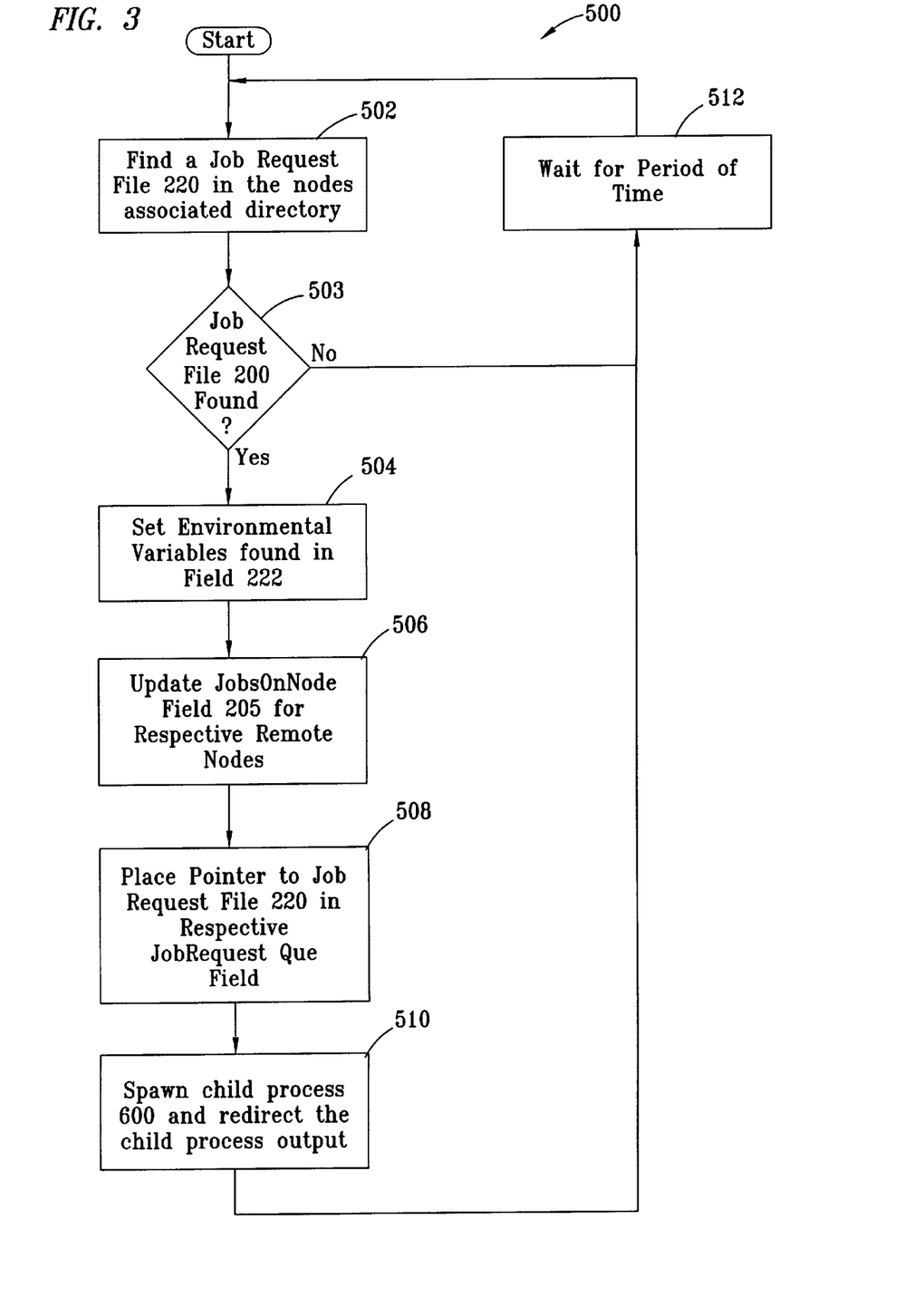
FIG. 3 presents a flow chart illustrating a node daemon object of the invention.
Figure 4:
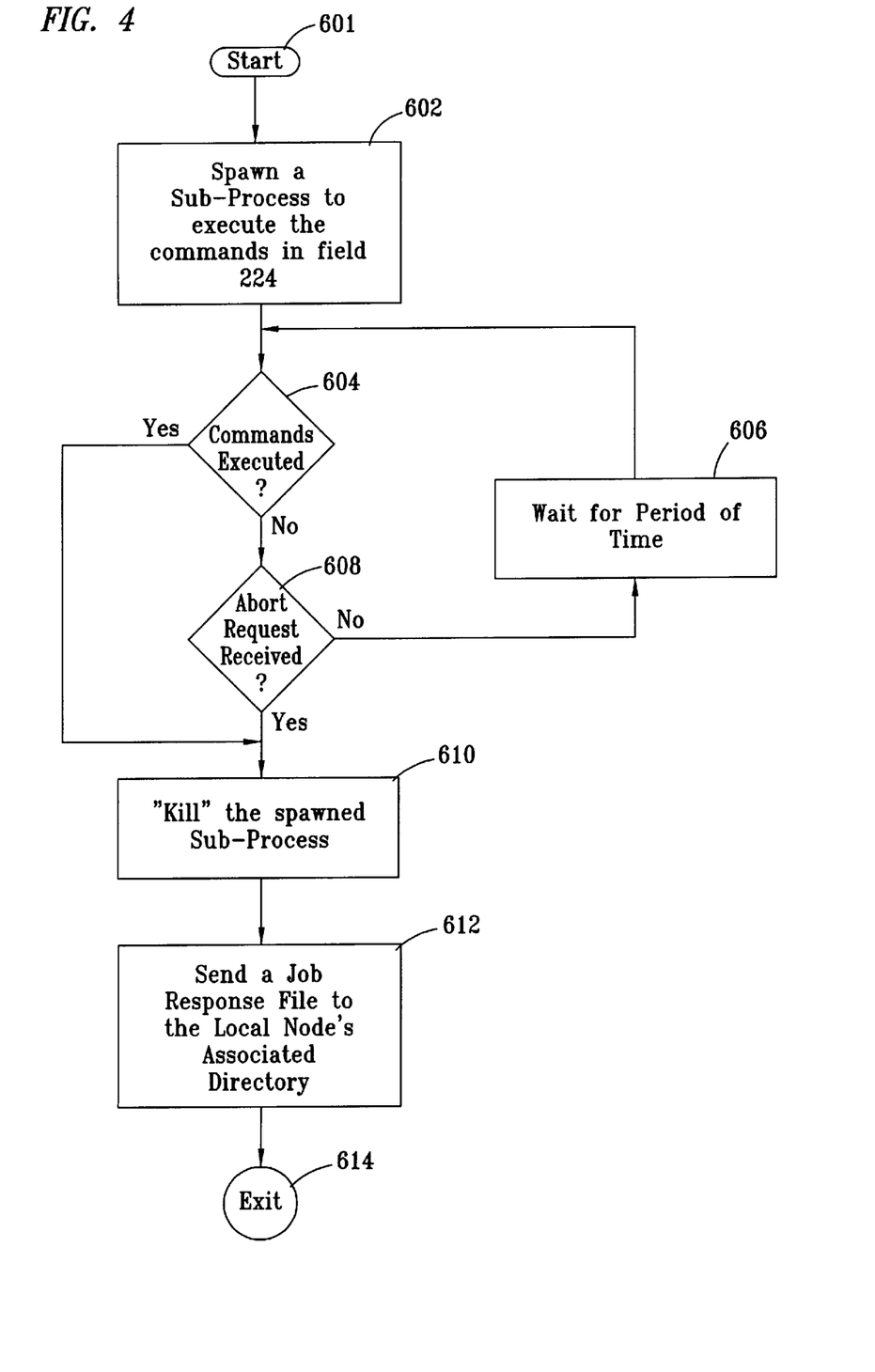
FIG. 4 presents a flow chart for the child process object spawned by the node daemon object of the invention.
Figure 5:
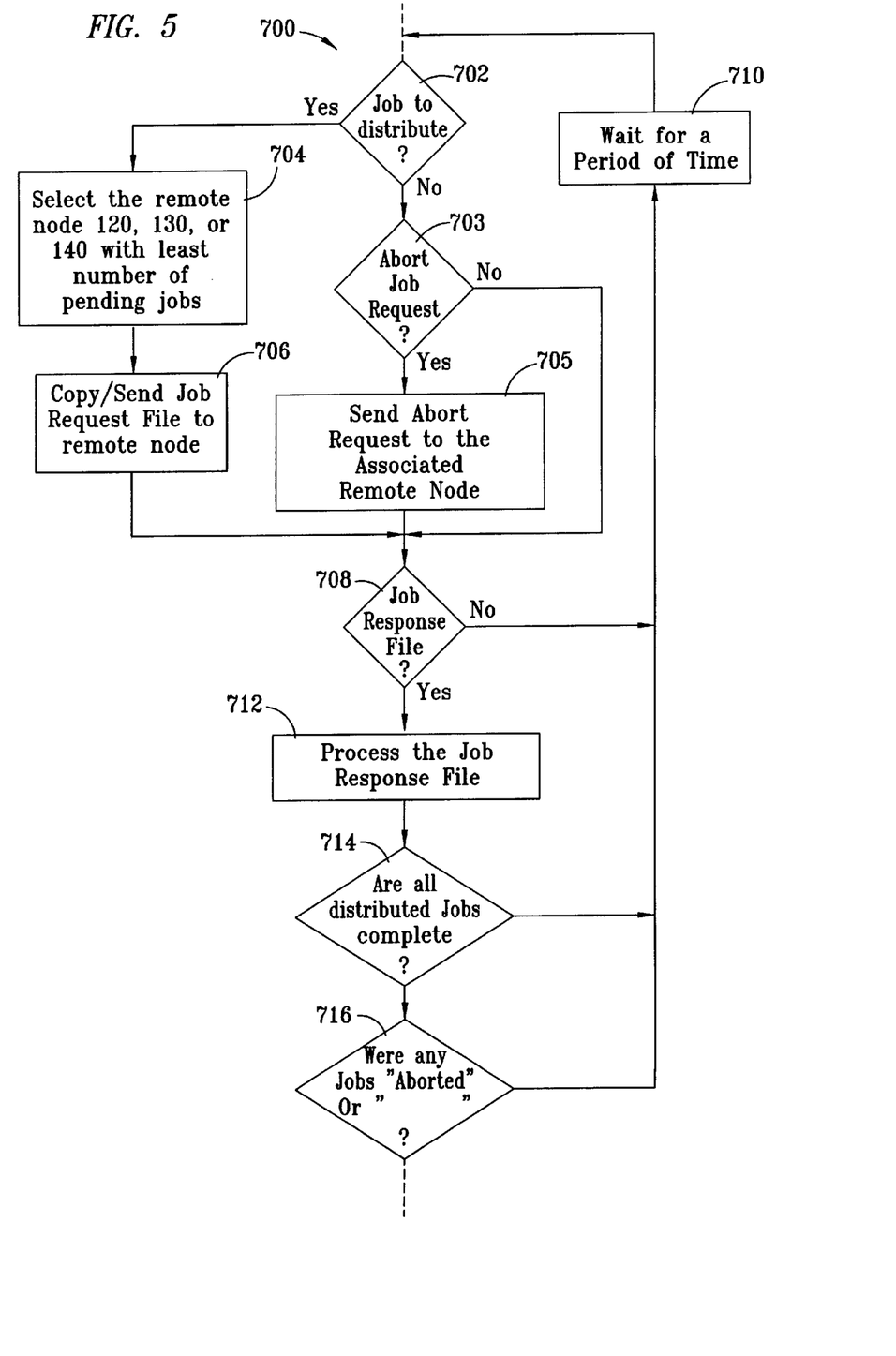
FIG. 5 presents a flow chart for the job balance object of the invention that distributes jobs across the network.

FIGS. 3–5 illustrate the object components of the distribution system: a node daemon object 500, a child process 600, and a job balance object 700. The objects are set out in greater detail in the Microfiche Appendix.

The flow chart of FIG. 3 illustrates a node daemon object 500. A node daemon object 500 is present on each of the remote nodes that participate in the job workload distribution. For clarity, the node daemon objects on respective remote nodes 120, 130, and 140, have a nomenclature representing an executable daemon object on that remote node. Thus, daemon object 500a is executable on remote node 120, daemon object 500b is executable on node 130, and daemon object 500c is executable on remote node 140. Discussions regarding the daemon object 500a apply to these daemon objects 500a, 500b, and 500c. Preferably, all of the remote nodes of the network are used in the distribution scheme, but fewer can be used to achieve the advantages of the invention.

In step 502, the node daemon object 500 searches the remote node for a JRF 220 (see FIG. 2) in the cross-mounted sub-directory of that remote node. If a JRF 220 is found in step 503, the node daemon object 500 sets the environmental variables in step 504 for the job request as set out in EnvironmentalVariable field 222. Examples of environmental variables are "path," "pwd" (present working directory), and the like. Otherwise, if a JRF 220 is not found in step 503, the daemon object 500 waits in step 512 for a predetermined time period, discussed below. After the lapse of the predetermined time period, the daemon object 500 again searches the remote node for a JRF 220.

In step 506, the node daemon object 500 updates the JobsOnNode field 205 in the node distribution table 200 for the respective data structures 202, 232, or 252, of remote nodes 120, 130, or 140. The JobsOnNode field 205 contains information regarding the total job amount of the node, which is typically a numerical value representing the number of pending jobs on that node. In step 508, the JobRequestQue field 206 is updated with the location of the JRF 220. Preferably, a software pointer is appended in the JobRequestQue field 206.

After the environmental variables are set, in step 510 a child process 600 is spawned on the remote node. The term "spawn" as used herein means generating a background process to carry out a particular task. A spawned task is assigned a lower priority in the CPU time allotment of the remote node than tasks running in the remote node foreground. The spawned task will often perform its work invisibly unless the daemon process 500 or user requests a task update. Also in step 510, the job output is redirected to a specified output file in the OutputFileName field 228 in the data structure for that remote node in the node distribution table 200.

In step 512 the node daemon object 500 waits for a period of time to allow jobs to be processed on that node. The wait period is an amount of time sufficient to prevent the node daemon object 500 from monopolizing the CPU resources of the remote node and to allow a change in job queue statuses before the remote node is queried again for a JRF 220. A preferable wait period is about sixty seconds.

The flow chart of FIG. 4, illustrates the child process 600. A child process 600 is spawned as needed by node daemon objects 500a, 500b and 500c in step 510 of FIG. 3, on respective remote nodes 120, 130, and 140, to execute the commands in job command field 224. For clarity, the child process spawned by a daemon object has a correlating designation. For example, a child process 600a is spawned by the daemon object 500a on the remote node 120.

More particularly, the child process 600 in step 602 spawns a sub-process to execute the commands in Job Command field 224. The child process 600 continues to poll for completion of the command execution in step 604 or for an abort command in step 606. The abort request can be received from the job balance object 700 (FIG. 5) or from the sub-process spawned by the child process in step 602.

If in step 604 the commands have been executed or if in step 606 an abort request has been received by the child process 600, then the sub-process spawned in step 602 is killed in step 610. The term "killed" is a UNIX command that stops a process and returns control to the spawning process. In this case, the spawning process is a child process 600. Otherwise, if in step 604 no command has completed its execution or if in step 606 an abort request was not received, then the child process waits for a predetermined time period in step 608 before checking the command status in steps 604 and 606.

After the spawned sub-process is killed, in step 612 a completion response is a WRITE to node distribution table structure 202 for that node, in the JobResponseQue field 208 (FIG. 2). The first or local node 110 READS the completion response in the JobResponseQue field 208. When the command is completed, the child process exits in step 614, and control is returned to the daemon object 500.

Referring to FIG. 5, a flow chart for the job balance object 700 is shown. In step 702 the job balance object 700 reads node distribution table 200 to determine whether there is a job to distribute. The determination is based on the average number of jobs for each of the participating remote nodes 120, 130, and 140. A balance is achieved by each remote node having an average number of pending jobs. For example, if a test case set has a total of three jobs, then each remote node 120, 130, and 140 would receive one JRF 220. If there is no job to distribute in step 702, then the job balance object 700 in step 703 determines whether an abort request was submitted by an operator. If an abort request was submitted, then in step 705 the abort request is sent to the appropriate remote node 120, 130, or 140. Otherwise, if there is no abort request 705, then the job balance object 700 continues with step 708, discussed below in detail.

Upon finding a job to distribute, in step 704 the job balance object 700 selects the remote node with the least amount of pending jobs. The remote node is selected by polling the corresponding remote node data structures in node distribution table 200 (see FIG. 2). Based on the job "weight" per node represented in the node distribution table, in step 706 the job balance object 700 copies the JRF 220 to the selected remote node.

In step 708, the balance object 700 determines whether a job completion response has been issued by the remote nodes 120, 130, or 140. A determination is made by checking the JobResponseQue field 208 in node distribution table 200 (see FIG. 2) that corresponds to that remote node. If there is not a completion response, then in step 702 the job balance object 700 continues job distributions after waiting for a predetermined time period in step 710. The time period preferably avoids pre-occupying the CPU resources of the local node 110 and allowing a change in job que statuses in the node distribution table 200. A preferable time period is about sixty seconds. The job balance object has a continuous loop that dynamically polls and allocates the JRFs to the remote nodes 120, 130, and 140, accordingly.

If a job completion response has been issued by a child process 600 spawned by node-processing objects 500a, 500b, or 500c, the job balance object 700 processes the job completion response in step 712. The job balance object 700 determines whether the job status is either "complete," "aborted," or "failed." If an "aborted" or "failed" status results, then there is no need to continue processing the remainder of the user job set, and standard exit processes are initiated to purge the remaining jobs across the nodes. Otherwise, the job balance object 700 determines whether all the jobs distributed to remote nodes 120, 130, and/or 140 are complete by polling the corresponding data structures 202, 232, 252 of node distribution table 200.

Referring to TABLE 1, shown is a job distribution example. Initially, JRFs 220 are submitted to remote nodes 120, 130, and 140. Each node initially has five jobs as shown in the "Submit" row. Due to the characteristics of each node, one node may complete jobs at a faster rate than the other. Referring to the "Post Execution" row, the remote nodes 130 and 140 could possibly complete three jobs before the remote node 120 completes one. Because the continuous loop feature of job balance object 700 expedites job completions, the jobs can be redistributed, as shown in the "Assign" row, by distributing or assigning JRFs from node 120 to nodes 130 and 140.

TABLE 1

| ACTION | JOBS PENDING ON NODE 120 | JOBS PENDING ON NODE 130 | JOBS PENDING ON NODE 140 |
| --- | --- | --- | --- |
| SUBMIT | 5 | 5 | 5 |
| EXECUTION | 4 | 2 | 2 |
| ASSIGNED | 3 | 3 | 2 |

Another example, as shown in TABLE 2, shows remote nodes 120, 130, and 140 having initial job submissions of ten, fifteen, and eight, respectively. The jobs are then distributed by assigning an average amount of eleven jobs to each node. After time has elapsed, the number of pending jobs remaining is nine, eight, and seven, for nodes 120, 130, and 140, respectively. Distribution takes place by assigning each node an average of eight jobs to each node. The distribution process continues until the task set is completed.

TABLE 2

| ACTION | JOBS PENDING ON NODE 120 | JOBS PENDING ON NODE 130 | JOBS PENDING ON NODE 140 |
| --- | --- | --- | --- |
| SUBMIT | 10 | 15 | 8 |
| ASSIGN | 11 | 11 | 11 |
| EXECUTION | 9 | 8 | 7 |
| ASSIGNED | 8 | 8 | 8 |

Although this invention has been described with reference to a specific embodiment, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A job distribution system implemented by a computer network with a plurality of nodes having a local node and at least one remote node, each of the nodes of the plurality of nodes capable of executing one or more job commands, and each of the nodes of the plurality of nodes having a local directory cross-mounted with the local directories of the plurality of network nodes, the job distribution system comprising:

a job balance object on the local node of the plurality of nodes, said job balance object having access to the local directory of the at least one remote node and being capable of reading a node distribution table and distributing a plurality of job requests to the at least one remote node;

a node daemon object on the at least one remote node of the plurality of nodes, the node daemon object capable of updating a node distribution table with a job status value; and an updatable node distribution table having a plurality of distribution data structures, each data structure of said plurality of distribution data structures corresponding to each of the at least one remote node having said node daemon object, and being capable of being updated by said node daemon object with a job status value, wherein said job balance object reads said plurality of distribution data structures to determine which of a plurality of job requests are pending on the at least one remote node and distributes said plurality of job requests to the at least one remote node.

2. The job distribution system of claim 1 wherein said job balance object distributes said plurality of jobs one or more jobs according to an average of said job status value per each of the at least one remote node.

3. The job distribution system of claim 1, wherein said node daemon object is capable of spawning at least one child process to execute a job request of said plurality of job requests.

4. The job distribution system of claim 1 wherein said updatable node distribution table is stored on one of the local directories of said plurality of nodes.

5. The job distribution system of claim 1 wherein said node distribution table is stored on the local directory of the local node.

6. The job distribution system of claim 1 wherein said job status value is an amount of pending jobs requests on the at least one remote node.

7. The job distribution system of claim 1 wherein each of said distribution data structures has a WorkLoad field, a JobsOnNode field, a JobRequestQue field, and a JobResponseQue field updatable with said job status value.

8. The job distribution system of claim 1 wherein said job balance object is capable of copying said plurality of job requests to a local directory of the at least one remote node.

9. The job distribution system of claim 1 wherein said job balance object sustains an average of pending job requests across the plurality of nodes.

10. The job distribution system of claim 1 wherein said object assigns a new job to a node having a lowest amount of pending jobs with respect to the at least one node.

11. A workload distribution method for a computer network with a plurality of nodes in a local-remote node relationship having a network file system that cross-mounts a local directory of each node with the local directories of each other node, the workload distribution method comprising the steps of:

providing an updatable node distribution table with a plurality of distribution data structures, each data structure of the plurality of distribution data structures correlating to a node of the plurality of nodes;

providing a job balance object on a local node of the plurality of nodes;

submitting a plurality of job requests by each node of the plurality of nodes;

using at least one node daemon object to update each of the distribution data structures that correspond to each of the nodes of the plurality of nodes with a first job status value;

using the job balance object to read each of the distribution data structures to determine which of the plurality of job requests are pending on each of the plurality of nodes;

using the job balance object to balance the plurality of job requests among the plurality of nodes according to a balancing criteria; and updating the distribution data structures that correspond to each of the nodes of the plurality of nodes with a second job status value when a job request of the plurality of job requests is executed.

12. The workload distribution method of claim 11 wherein the balancing criteria is based on an amount of pending jobs on a node of the plurality of nodes being less than an average of job requests for all the nodes of the plurality of nodes.

13. The workload distribution method of claim 11 wherein the balancing criteria further comprises a capability to redistribute the plurality of job requests to sustain a balance of job requests of each node of said plurality of nodes.

14. The workload distribution method of claim 11 wherein the step of balancing the job requests further comprises the step of copying one or more of the plurality of job requests to the other nodes.

15. The workload distribution method of claim 11 wherein the second job status value is a pointer to a job response file.

16. A method of distributing computer jobs to a plurality of remote nodes on a network from a local node comprising the steps of:

maintaining on a remote node an updatable node distribution table corresponding to each of the plurality of remote nodes;

updating a job status value in each of said tables as jobs are assigned and when the jobs are completed;

reading said tables via the job balance object on the local node; and balancing, via the job balance object on the local node, an assignment of a plurality of new jobs to the plurality of remote nodes as a function of jobs remaining to be executed at that node as compared to the average number of jobs for all of the plurality of remote nodes.

* * * * *

UNITED STATES PATENT AND TRADEMARK OFFICE
CERTIFICATE OF CORRECTION

PATENT NO. : 6,202,080 B1
DATED : March 13, 2001
INVENTOR(S) : Lu et al.

It is certified that error appears in the above-identified patent and that said Letters Patent is hereby corrected as shown below:

Column 5,
Line 51, delete "structure" (second occurrence)

Column 6,
Line 10, delete "500a" insert -- 500 --

Signed and Sealed this

Eighth Day of January, 2002

Attest:

Attesting Officer

JAMES E. ROGAN
Director of the United States Patent and Trademark Office